United States Patent
Feiten

[19]
[11] Patent Number: 5,842,381
[45] Date of Patent: Dec. 1, 1998

[54] PRECISELY CONTROLLABLE FLEXIBLE ACTUATOR

[75] Inventor: Wendelin Feiten, Neubiberg, Germany

[73] Assignee: Siemens Aktiengesellschaft, Munich, Germany

[21] Appl. No.: 776,347

[22] PCT Filed: Jul. 13, 1995

[86] PCT No.: PCT/DE95/00918

§ 371 Date: Jan. 24, 1997

§ 102(e) Date: Jan. 24, 1997

[87] PCT Pub. No.: WO96/03260

PCT Pub. Date: Feb. 8, 1996

[30] Foreign Application Priority Data

Jul. 28, 1994 [DE] Germany ............... 44 26 811.4

[51] Int. Cl.⁶ .................................................. B25J 18/06
[52] U.S. Cl. .................. 74/490.04; 74/502.1; 901/21
[58] Field of Search .................. 74/490.04, 490.01, 74/502.1; 901/21, 14, 15, 19, 23

[56] References Cited

U.S. PATENT DOCUMENTS

| | | |
|---|---|---|
| 3,266,059 | 8/1966 | Stelle . |
| 4,848,179 | 7/1989 | Ubhayakar ............... 74/490.04 |
| 4,977,790 | 12/1990 | Nishi et al. ............... 74/490.04 |
| 5,172,551 | 12/1992 | Nakajima et al. ............ 901/19 |
| 5,286,154 | 2/1994 | Jens et al. ................. 901/21 |
| 5,297,443 | 3/1994 | Wentz ..................... 74/490.04 |
| 5,317,952 | 6/1994 | Immega ................... 74/490.04 |
| 5,469,756 | 11/1995 | Feiten .................... 74/490.05 |
| 5,567,110 | 10/1996 | Sutherland ............... 74/490.04 |

FOREIGN PATENT DOCUMENTS

| | | |
|---|---|---|
| 43 37 096 C1 | 11/1994 | Germany . |
| 2228644 | 8/1990 | United Kingdom . |

*Primary Examiner*—Charles A. Marmor
*Assistant Examiner*—David M. Fenstermacher
*Attorney, Agent, or Firm*—Hill & Simpson

[57] ABSTRACT

The actuator is in the form of a helical spring. The helical spring in this case has an S-shaped cross-sectional profile and is constructed in such a way that the respectively lower edge overlaps the respectively upper edge of an adjacent spring turn. Tension cables which are guided along eyes on this spring can curve and compress the latter, and the spring can be stretched again by further tension cables, which are preferably provided and are guided in loops around the mutually overlapping edges. In addition, blocking apparatus with which it is possible to deliberately block adjacent spring turns are provided in the form of control elements in the overlap zone. The actuator can be imparted in any desired shape by suitable application of tension and, as the case may be, pressure in conjunction with the blocking apparatus. Fields of application are service robots for use in office or domestic environments, or low-cost production robots.

11 Claims, 6 Drawing Sheets

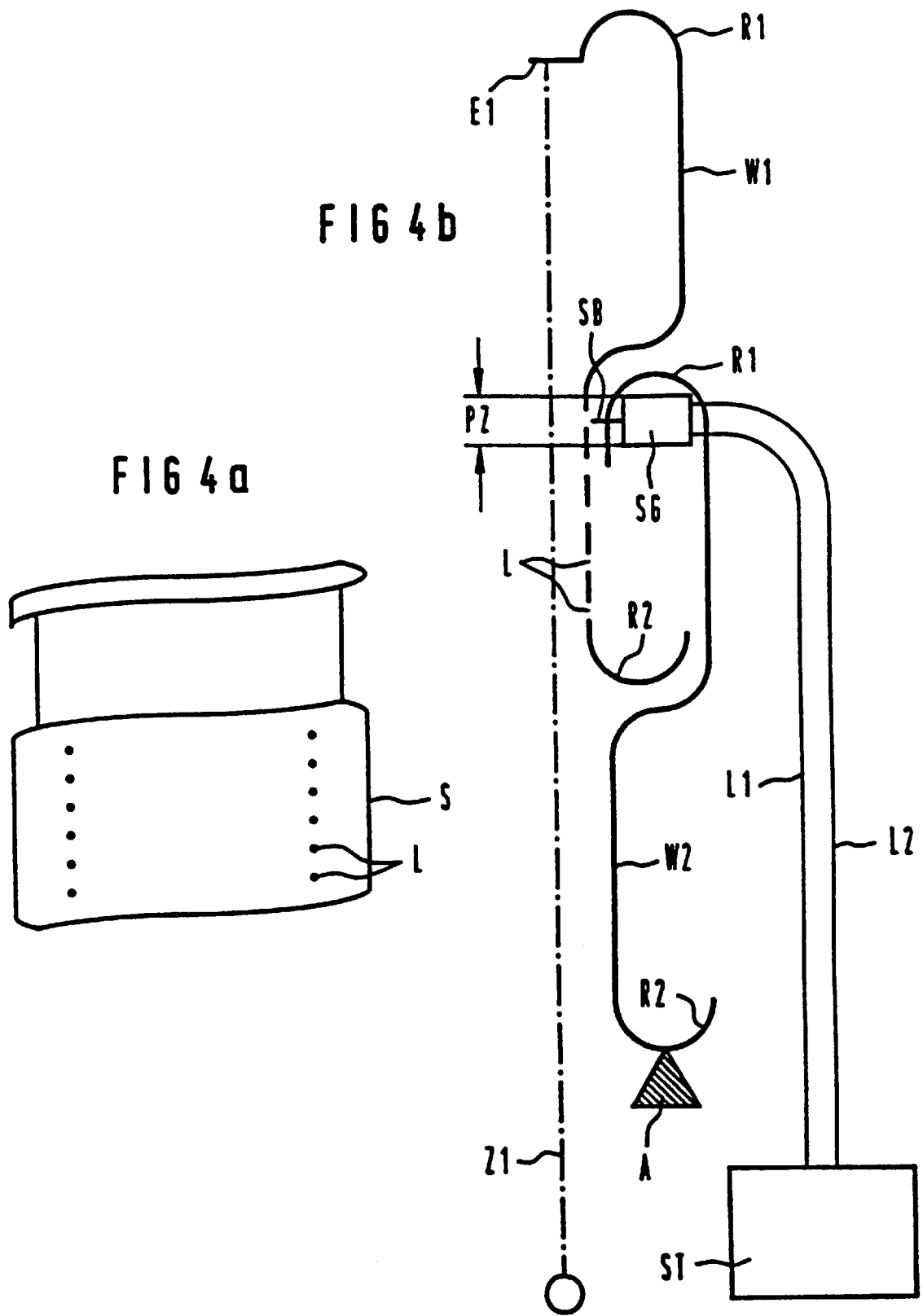

PRECISELY CONTROLLABLE FLEXIBLE ACTUATOR

BACKGROUND OF THE INVENTION

Machines are ever more frequently carrying out even complicated manipulations. In some cases, it is also necessary for actuators to be able to reach locations which are inaccessible or dangerous for persons. Examples of such actuators are robot arms which are used in industrial production or microactuators which are used, for example, for grippers.

Industrially used actuators are frequently complicated units which are equipped with many sensors and whose movement mechanics require expensive regulation and control. Given the increasingly more technical nature of areas outside so-called high-tech environments, it seems to be desirable for actuators which can be produced cost effectively and are easy to control to be available. A future field of use of such low-cost units would be, for example, conceivable in the case of service robots in office or domestic environments.

Large numbers of actuators are known. U.S Pat. No. 3,266,059 discloses a flexible prestressed arm. Metal strips having a U-shaped cross-sectional profile are wound helically to form this arm. An arm is formed in each case by two strips constructed in such a way. The said arm is constructed in this case in such a way that the U-shaped profiles of the two helically wound metal strips cross one another. Thus, the construction of an arm in each case requires a metal strip one U-profile of which points outwards relative to the longitudinal axis of the arm, and the other U-profile of which points inwards relative to the longitudinal axis of the arm. The metal strips can be prestressed by a helical spring in this case. Adequately guided tension cables are used to stretch and compress the arm.

SUMMARY OF THE INVENTION

It is the object of the invention to specify a flexible actuator which, particularly in the direction of extent, has a very high elastic deformability and whose available force can be prescribed in any of its movement directions, and which can be subdivided as desired into rigid and movable segments of any desired size.

In general terms the present invention is a flexible actuator, having a helical spring comprising at least one elastically deformable material. The cross-sectional area of a turn of the helical spring has in the longitudinal direction of the helical spring an elongated profile which has a bent-over edge at each of its ends. The first edge is bent over towards the spring longitudinal axis and the second edge is bent over away from the spring longitudinal axis. The helical spring is configured such that the respective first edge and the respective second edge of two adjacent turns of the helical spring overlap in an overlap zone. The first and/or second edge is designed in the overlap zone such that it extends essentially parallel to the respectively adjacent turn of the helical spring, with the result that it forms a parallel zone therewith. There is provided the at least one location of a respective parallel zone a controllable arresting means to which the mutual displaceability of the adjacent turns can be blocked. Guide eyes are provided uniformly distributed on the circumference of the helical spring such that they are situated on at least three first parallel axes in the direction in which the helical spring extends, which axes have virtually the same separation from one another. First tension cables which are all secured at the first end of the helical spring are guided along the first parallel axes through the eyes. A desired direction of movement is produced owing to the fact that tension is exerted on at least one of the tension cables at the second end of the helical spring. Thereby, as a function of the at least one controllable arresting means, the guide eyes through which at least a first tension cable is guided, are moved closer to one another.

Advantageous developments of the present invention are as follows.

Uniformly distributed guide slots are provided on the circumference of the helical spring such that they are situated on at least three second parallel axes, which have virtually the same separation from one another, in the direction in which the helical spring extends. Second tension cables are guided along the second parallel axes through the guide slots such that they respectively embrace the mutually overlapping first and second edges in the form in each case of at least one loop. These second tension cables all are secured at the first end of the helical spring. A desired direction of movement is produced owing to the fact that tension is exerted on at least one of the tension cables at the second end of the helical spring. Thereby, as a function of the at least one controllable arresting means, the guide eyes through which this at least one first tension cable is guided are moved closer to one another, or the mutually overlapping edges which this tension cable embraces are moved closer to one another.

There is provided as arresting means a control element which has a blocking means which experiences a movement upon activation of the control element. The control element is secured on one of the adjacent turns and blocks the respective other turn with the blocking means.

The first and second parallel axes are situated one above the other.

The control element is designed at least as a thermal, hydraulic, magnetic, pneumatic, piezoceramic, or electrostatic control element.

The arresting is performed by friction.

A rod, which is of arbitrary cross section and engages in at least one hole, is provided as arresting means.

An arresting means is provided for at least each first tension cable in the respective parallel zone.

At least the helical spring and the tension cables are electrically insulated from one another and are connected to a current source in an electrically conductive fashion.

At least one control element is electrically connected to the helical spring and to a tension cable.

At least a first and a second control element has at least a first, second and third electric connection. The respective control element is actuated by applying a voltage to the first and second connection. After actuation the second connection is connected to the third one and the third connection of the first control element is connected in an electrically conductive fashion to the first connection of the second control element. A switch for interrupting the circuit is respectively connected upstream of at least the first and the second electrical connection.

A particular advantage of the actuator according to the invention consists in that it is embodied by a helical spring which is longitudinally elastic over a wide range. This produces in a particularly simple way a large play of movement for an effector mounted on the first end of the actuator. The actuator according to the invention has the further advantage that the control of the regulation need not be conducted so exactly, or that it is possible to dispense with high-precision sensors, since when the effector, which is secured at a first end, for example, strikes the elastic deformability of the actuator ensures that no objects are damaged. The result of the particular configuration of the profile shape of the turns in conjunction with the arresting means provided and their actuation, as the case may be, is that the tension cables can apply a force which is independent of the spring constant.

It is particularly advantageous that the actuator according to the invention can be given any desired shape. It is compressed by one type of cooperating tension cables, and can be stretched by the other type. In conjunction with the arresting means, which can be activated separately and can mutually block adjacent turns of the helical spring, any desired curved or stretched shape of the actuator can be achieved, since it can be made stiff or flexible over any desired length.

Since the adjacent helical spring turns have a very small spacing from one another, it is expediently provided in the actuator according to the invention to use control means which experience a change in length or a change in position when they are actuated in order thereby to move blocking means which mutually block two adjacent spring turns in the parallel zone.

In order to achieve a favorable compact design, it is expedient to guide the tension cables for stretching the helical spring and the tension cables for compressing the helical spring parallel to one another.

It is particularly favorable to use cost-effective and easily activatable control elements such as, for example, piezoceramic, hydraulic, thermal, pneumatic or electrostatic as well as magnetic designs.

It is advantageous in the case of the actuator according to the invention to provide blocking means which use friction to block two adjacent spring turns relative to one another, there being a drop in the outlay on production for an actuator as a result.

It is particularly favorable to provide as arresting means rods which engage in holes of adjacent spring turns, since this represents an arresting means which are technically simple to realize and cost effective to produce.

It is advantageous in the case of the actuator according to the invention to provide an arresting means on each tension cable within the parallel zone. The result of this is that the actuator can also be blocked in a curved shape and a higher stability is achieved thereby by means of the arresting process.

The invention advantageously provides the use of electrically conductive tension cables and springs, since thus the control elements can be supplied with current in a simple way.

An actuator according to the invention advantageously has control elements which have three connections, the first connection being connected to the second connection and, when the control element has switched, the second connection being connected to the third connection. The advantageous result of this is that it is possible using only three signal lines to activate as many control elements as desired when a signal is switched through serially in this way.

Owing to the favorable fitting of switches for interrupting the circuits at the respective connections of control elements, it is possible by suitable application of tension and pressure via the tension cables and, as the case may be, activating and releasing the individual arresting elements to achieve any desired shape of the actuator from outside.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 4a–4b shows an example of an actuator according to the invention together with a control element in section, FIGS. 5a–5c gives examples of different control elements.

DESCRIPTION OF THE PREFERRED EMBODIMENTS

Figure 1A:
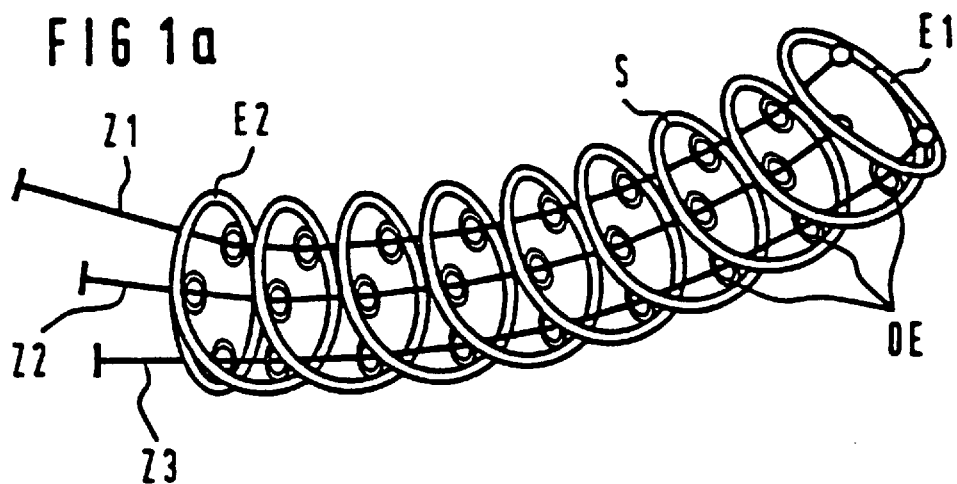
FIGS. 1a–1c shows a diagrammatic actuator in three different states of movement.

As may be seen from FIG. 1, a part, provided for moving the actuator by compressing the helical spring S, of an actuator according to the invention comprises an elastic helical spring S which can be made, for example, from an elastic synthetic material or steel. This part of the actuator according to the invention will firstly be explained more precisely for the purpose of more effectively illustrating the mechanical relationships and the operating principle associated therewith. Mounted in a uniformly distributed fashion along this helical spring S are guide eyes OE for tension cables Z1, Z2, Z3. As FIG. 1 shows further, the tension cables extend in a virtually axially parallel fashion along the actuator. These tension cables Z1 to Z3 are secured at the end E1 of the helical spring S. They are guided along the helical spring S through the eyes OE, and emerge in a freely movable fashion at the end E2 of the helical spring S. Also represented in FIG. 1 are three different states of movement of the actuator according to the invention.

It is seen in part a that tension was exerted on the tension cable Z1. If the end E2 is regarded as being held firm, this tension has the effect that the eyes for which the tension cable Z1 is guided move closer to one another. As a result, the actuator according to the invention is curved in the direction of the tension cable Z1. At the same time, the freely movable tension cables Z2 and Z3 are drawn into the actuator.

Figure 1B:
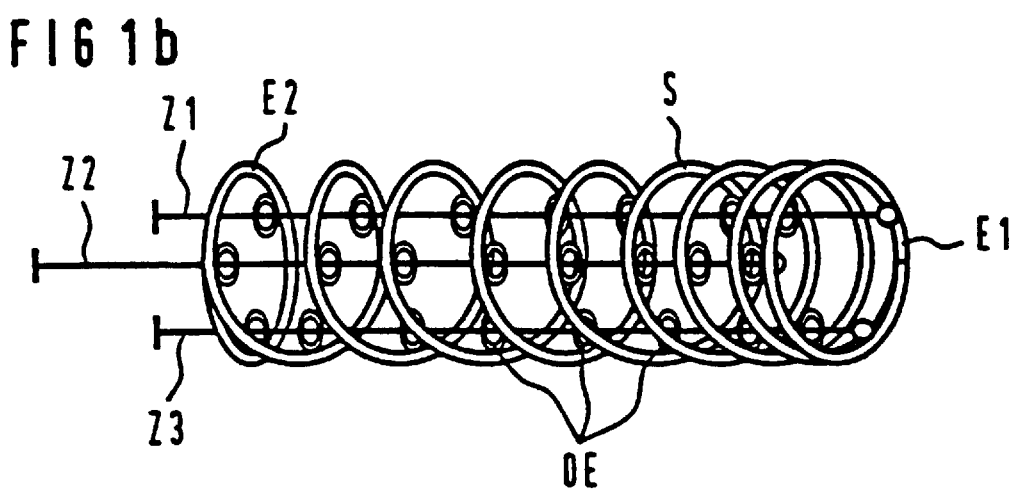

FIG. 1b shows the same example for the tension cable Z2. The exertion of tension on the tension cable Z2 moves the end E1 in the direction of the observer and correspondingly curves the actuator according to the invention. The tension cables Z1 and Z3 are drawn into the actuator in this case by the appropriate guide eyes.

Figure 1C:
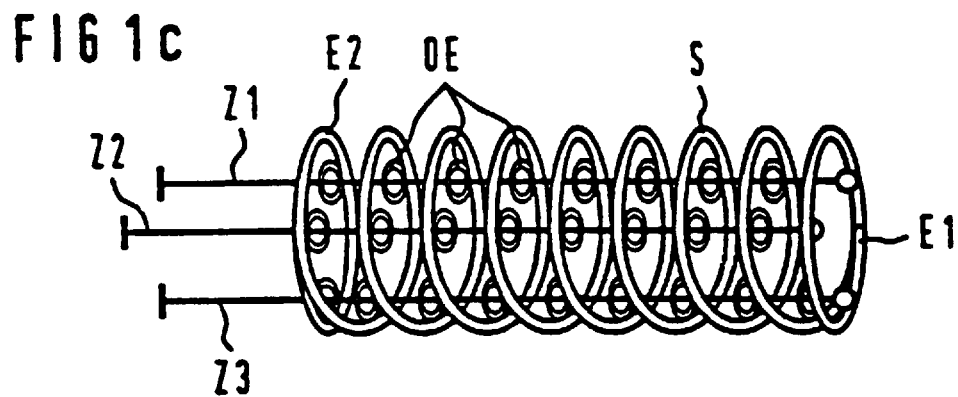

A shortening of the actuator according to the invention is illustrated in FIG. 1c. This shortening is achieved by simultaneously exerting tension on the three tension cables Z1 to Z3. With the end E2 held firm, the effect of this tension is that the helical spring S is shortened along its longitudinal direction. An effector secured at the end E1 is then moved along the longitudinal direction of the helical spring S. The result of this inventive configuration of an actuator is that an effector can be maneuvered at virtually every point inside a sphere whose radius corresponds to the length of the helical spring S.

Figure 2A:
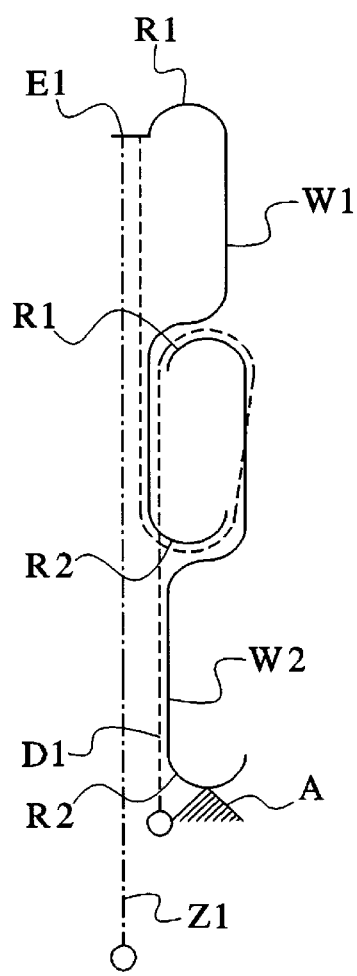
FIGS. 2a–2b shows the principle of the control of movement on an actuator.

Two sections through an actuator according to the invention are represented in FIGS. 2a and b in order to illustrate the principle of the mode of operation in the case of the movement of such an actuator. This sectional view is obtained by selecting a sectioning plane which contains the longitudinal axis of the actuator spring and by means of which all turns of the helical spring are intersected once. A view onto this sectioning plane then shows the individual intersected turns. This principle of representation is used in FIG. 2 and in the following figures, unless otherwise mentioned. In order to obtain a helical spring for an actuator according to the invention from this section, it has to be rotated about the longitudinal axis of the spring, accompanied by a translation along the longitudinal axis of the spring.

Two adjacent turns W1 and W2 of an actuator are to be seen in detail in FIG. 2. Furthermore, the upper, bent-over edges R1 and the lower, bent-over edges R2 of said turns are to be seen. The profile W2 is secured in this case at a support A by means of its lower bent-over edge R2. In order to produce a movement of the actuator, tension cables Z1 and D1 are mounted at one end E1 of the actuator according to the invention. FIG. 2a shows in this connection the section through a part of the actuator according to the invention, this actuator being in the compressed state, in which the helical spring is compressed. This can be seen, for example, from the fact that the tension cable Z1 is drawn out of the actuator.

Figure 3A:
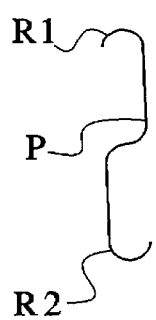
FIGS. 3a and 3b shows a view of a part of an actuator according to the invention and an associated sectioned area.

Represented alongside is the tension cable D1, which is drawn into the actuator shown in FIG. 3a. It may also be seen that this tension cable D1 embraces the upper edge R1 of the turn W2 of the actuator and the lower edge R2 of the turn W1 on the actuator. A loop is formed in this case around these two edges.

Figure 2B:
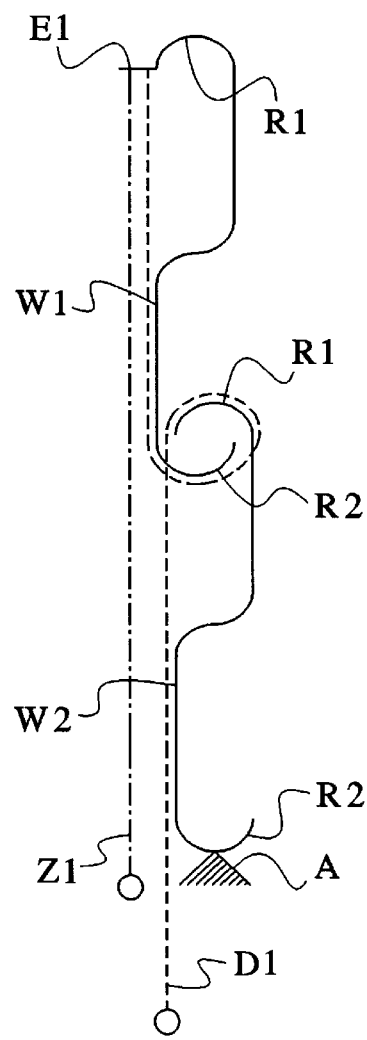

FIG. 2b shows a section through the turns of an actuator according to the invention, the actuator now being in a stretched state. This can be seen from the facts, on the one hand, that the tension cable Z1 is now completely drawn into the actuator, and that the tension cable D1 is drawn out of the actuator. This actuator in FIG. 2b thus follows from that in FIG. 2a by exerting tension on the tension cable D1.

The following happens in this process:

The turn W2 of the actuator according to the invention is held firm. The tension cable D1 is secured at one end E1 of the turn W1 of the actuator according to the invention. If tension is now exerted on the tension cable D1, the loop which is formed by the tension cable D1 around the lower edge R2 of the turn W1 and the upper edge R1 of the turn W2 is reduced by the tension. The result of this is that the upper edge R1 of the turn W2 of the actuator according to the invention and the lower edge R2 of the turn W1 of the actuator according to the invention are moved towards one another. It is therefore achieved in accordance with the invention that the helical spring, which comprises, for example, a profile such as is shown here in the sectional view can be stretched by a tension on a tension cable D1 provided according to the invention. This stretching operation can be performed, in particular, even against a force acting on the actuator from outside.

It is to be borne in mind, furthermore, when considering FIG. 2 that it is only a representation of the principle. In a real embodiment of an actuator according to the invention, a plurality of such tension cables Z1 and D1 would cooperate in pairs and may be distributed, for example, uniformly over the circumference of an actuator according to the invention. It is therefore possible to produce any desired movements. However, the actuator according to the invention has the great advantage that it is also possible for pressure which is independent, for example, of a spring constant of such an actuator to be exerted in the longitudinal direction by the tension cable D1 by means of an actuator according to the invention constructed in such a way.

The second constituent of an actuator according to the invention, which by comparison with FIG. 1 permits active stretching independently of the spring constant of the helical spring S improves the mobility of the actuator and thereby increases the number of its fields of use decisively. This actuator according to the invention is particularly easy to produce and not particularly complicated in terms of its design. It thereby opens up new fields of use. It can be conceived, for example, that it can be used in an autonomous production robot, or generally in a cleaning robot, or, for example, in a painting robot. Further advantages are that it can be produced cost effectively, and in that it is compliant in the sense that upon inadvertent contact with obstacles which neither damages the latter nor is itself damaged, and it can passively adapt in constricted work spaces to the contour of obstacles or open passages.

More than three tension cables can also certainly be used in the design of the actuator according to the invention. It is also important to bear in mind that a juxtaposition of a plurality of actuators according to the invention increases the number of degrees of freedom of movement.

Figure 3B:
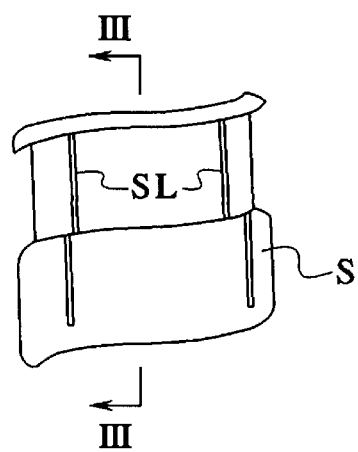

FIGS. 3a and 3b show partial view of an actuator according to the invention. A section of the helical spring S is represented here. Also to be seen is a profile of this helical spring P, which is produced by a section along the line AB and a view directed onto this sectioned area. Provided on the side of this helical spring S are guide slots for the tension cables D provided according to the invention. These are denoted by SL. The profile P produced by the section here has clearly recognizably bent-over edges R1 and R2. Such a profile can be produced, for example, from a very thin spring steel, and can be helically bound in the form of an actuator according to the invention.

Here, as well, only the example is concerned. It is also possible to use other profile shapes for an actuator according to the invention. We only have to satisfy the mechanical requirements placed on such an actuator, and the profile shape must ensure that two neighboring turns of the helical spring with their bent-over edges can be displaced relative to one another and form together with one another a parallel zone into which an arresting means can be inserted in order to block the mutual displaceability of adjacent turns. However, it is to be borne in mind in particular in this case that the mobility of the tension cables is not restricted by the arresting means.

FIG. 4 shows an actuator according to the invention as it was also represented diagrammatically in FIG. 2 and FIG. 3. The designations are used analogously. Here, however, the actuator according to the invention additionally has a control element SG which in this case has a rod SB which engages in holes L of SPRING S.

FIG. 4a shows here as an example a cross-sectional profile of the actuator according to the invention. Clearly to be seen are the holes L in the lower part of the turn of a helical spring S. A helical spring in the form of two turns W1 and W2 is represented diagrammatically in FIG. 4b in a fashion analogous to FIG. 2. Here, the lower part of the helical spring is to be seen, which is secured at its edge on a support A. W2 has an upper edge R1, which overlaps the lower edge R2 of W1. Secured in a parallel zone PZ is a control element SG which has a rod SB which can engage in holes L on the turn W1. A plurality of holes L are provided on the turn W1 in this case.

Since the lower part of the helical spring is represented here, W2 has no such holes. However, this does not represent any restriction of the embodiment according to the invention of an actuator. Primarily, a control element should be mounted wherever it is technically sensible and desired for technical implementation, and appropriate arresting means or blocking means should be provided on the adjacent spring turns in the parallel zone. The control element SG represented here is connected to two lines L1 and L2 by means of a controller ST. This controller can be used to activate the control element, and this has the effect that the rod SB is extended and engages in a hole L of the adjacent spring turn W1. The result is, for example, that the helical spring is arrested along the tension cable Z1, specifically in the region of the turns W1 and W2, in this case. However, this can also be separately coordinated by a controller ST along the other tension cables and also on other adjacent turns of the helical spring.

Any desired shape of the actuator can be achieved by appropriate control of tension and, as the case may be, pressure via the individual tension cables in conjunction with the activation of the individual control elements, which can block or release, as the case may be.

Figure 5A:
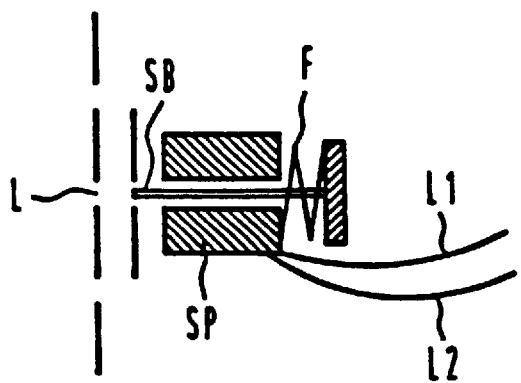

FIG. 5 shows three examples of control elements SG according to the invention. FIG. 5a shows a magnetic control element. There, a coil SP is provided, as is a rod SB which is provided with a restoring spring F. By actuating the control element via L1 and L2, that is to say by magnetizing the coil, the rod SB is guided into the hole L, which is located on the adjacent spring turn. It is to be borne in mind with all these control elements that the control element is secured on one spring turn and the hole is located in an adjacent spring turn.

Figure 5B:
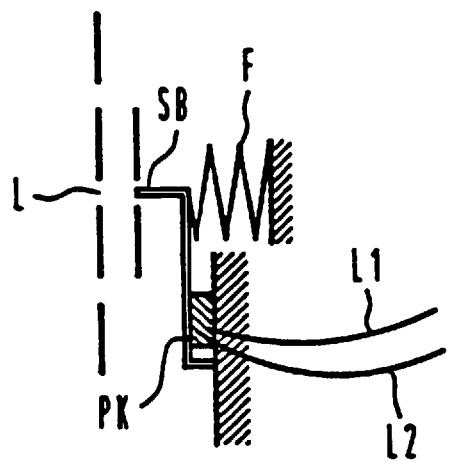

FIG. 5b shows a piezoceramic control element. Provided for this purpose is a piezoceramic oscillator PK which can be activated by means of lines L1 and L2 by a controller. A change in length via a lever arm guides the rod SB into the hole L in the other turn of the helical spring. After deactivation of the piezoceramic oscillator, a restoring spring F retracts the rod SB from the hole again and thereby again releases the spring turn.

Figure 5C:
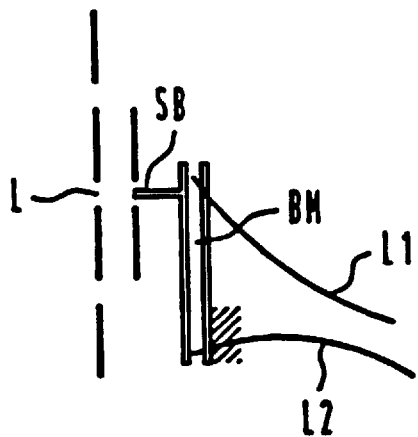

FIG. 5c shows a control element in the form of a bimetallic strip BM. The bimetallic strip is supplied with current by lines L1 and L2 and subsequently bends, with the result that the rod SB is guided into the hole L in the adjacent spring turn and thus mutually blocks the two spring turns. The result of using a rod in conjunction with a hole in which this rod SB engages is to enable a high stability to be achieved by a relatively low outlay on production.

Figure 6A:
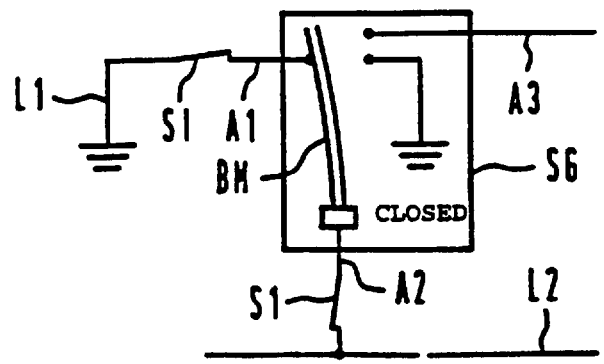
FIGS. 6a–6c illustrates the mode of operation of a control element having three connections, and FIGS. 7a–7f gives an example of control by seven control elements.
Figure 6B:
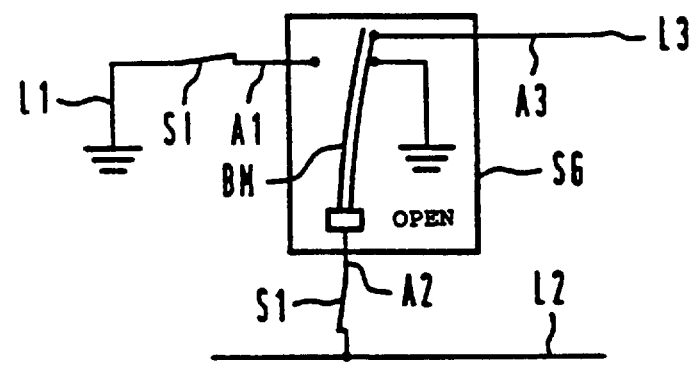

FIG. 6 shows the interaction of three connections on the control elements. Represented in part a FIG. 6a is a control element SG which operates by means of a bimetallic strip BM. Three connections A1 to A3 are provided. In order to activate the control element, a voltage potential is applied between the lines L2 and L1, and the switches SI and S1 are closed. The flow of current in the bimetallic strip has the effect that the latter heats up and bends. Subsequently, the state is obtained which is represented in FIG. 6b. After bending of the bimetallic strip BM, the latter goes into self retention, since the current now flows via the line L2 and the switch S1 at the connection A2 to the connection A3, which is connected to the line L3. For example, the control element in FIG. 6a blocks adjacent spring turns, and FIG. 6b shows the opened state.

Figure 6C:
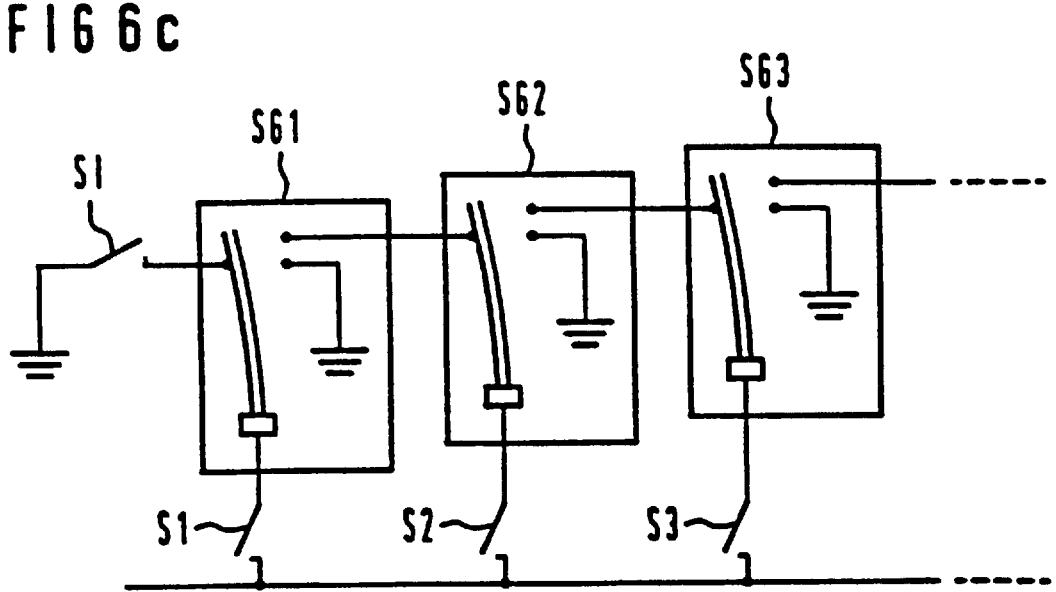

FIG. 6c shows how control elements SG1, SG2, SG3 can be connected in series with the aid of only two lines and a plurality of switches. For example, in this embodiment of the invention the control elements are supplemented by a control logic circuit which permits all the blocking means to be arranged on the actuator in a chain and to respond serially by means of this chain. Instead of a bimetallic strip, any desired control means already described can be used. The separation between every two turns of the helical spring can be adjusted as desired along each tension cable by means of the arrangement represented in FIG. 6c. FIG. 6c shows here the initial position or home position, in which all the blocking means are closed, for example. In order to start the serial circuit of the chain, the switches SI and S1 are firstly closed. As a result, the first element is switched, that is to say the corresponding blocking means is opened and, at the same time, the serial input of the next element in the chain is connected (here, this is connected to frame). The first element SG1 is now located in a self-retaining position, that is to say it remains active as long as the switch S1 is closed. In this phase, for example, the tension cable is used to adjust the distance of the two first turns of the spring along the first tension cable to the desired value. Subsequently, for example, the switch S1 can be reopened and is not closed again until a new pulse is to be sent over the chain. It is now possible, for example, for the second element (generally the next element in the chain, in each case) also to be activated via the switch S2. Once this has been done, the first element can be deactivated, that is to say the switch S1 can be opened. As a result, the blocking means is closed again and the first turn is arrested at its desired value along, for example, only a first tension cable.

In this embodiment, a control element SG can become active, for example, only when a pulse is present at its serial input (here, for example, when it is connected to frame). It is therefore advantageously no longer necessary for each control element SG to bear a dedicated line; it suffices at only three lines, which can be connected in parallel into three groups for the segments. This is explained in more detail in FIGS. 7a–7f.

FIG. 7 shows an example for controlling control elements SG1 to SG7 with the aid of four switches SI, S1, S2 and S3 with the aid of four control lines LI, L1, L2 and L3. Each control element SG is provided in this case with three connections A1 to A3. The activated state, that is to say the state in which the control element blocks, is patched in black. An advantageous implementation of the principle can be carried out here, for example. Accordingly, tension cables, for example, are used as supply leads, and the spring itself as frame. All that then remains as additional expenditure in addition to the actual combined control and switching elements is, for example, a further line which is guided along the turns of the helical spring from element to element. FIG. 7a shows such a control element SG1 in the activated state. FIG. 7b shows such a control element SG2 in the released state, that is to say the adjacent spring turns are not blocked by it. The first control element SG1 is blocked in FIG. 7c. This state is achieved by closing the circuit with the aid of the switches SI and S1. After opening the switch SI, the current flows in the control element SG1 via the switch S1 to frame, and further to the control element SG2, which is activated with the aid of the switch S2. This state is represented in FIG. 7d. The control element SG1 is released in FIG. 7e by opening the switch SI. The control element SG2 remains in self retention, since the switch S2 is still closed. In FIG. 7f, the control element SG3 is activated with the aid of the switch S3.

Figure 7A:
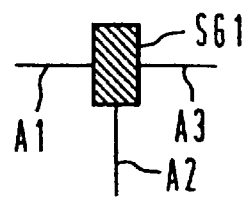
Figure 7B:
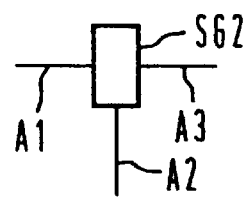
Figure 7C:
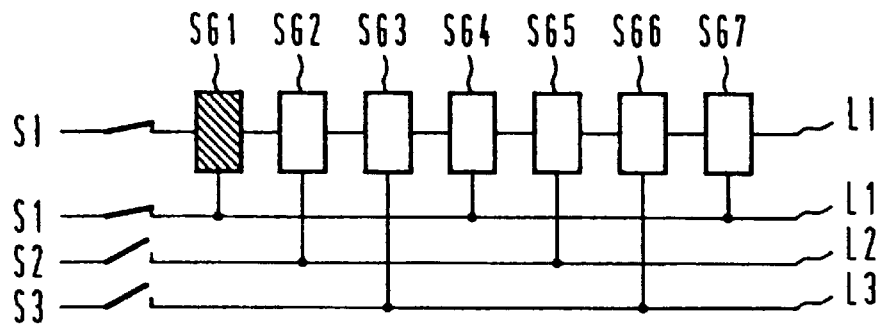
Figure 7D:
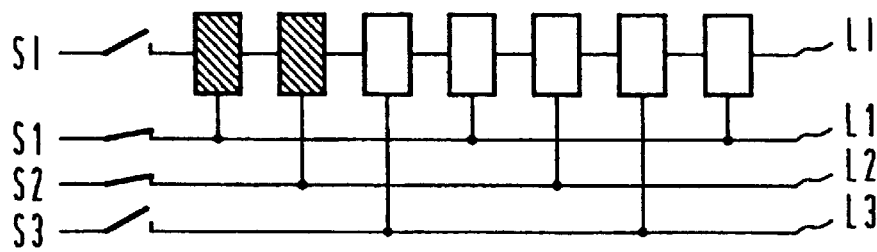
Figure 7E:
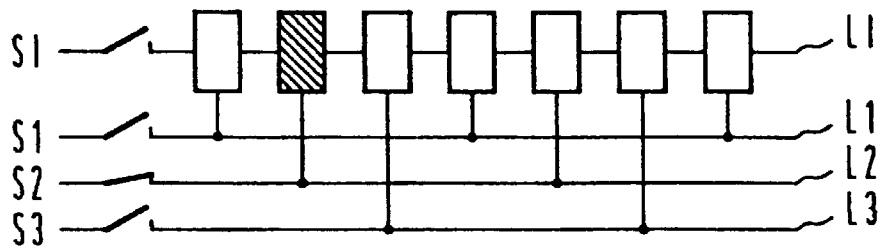
Figure 7F:
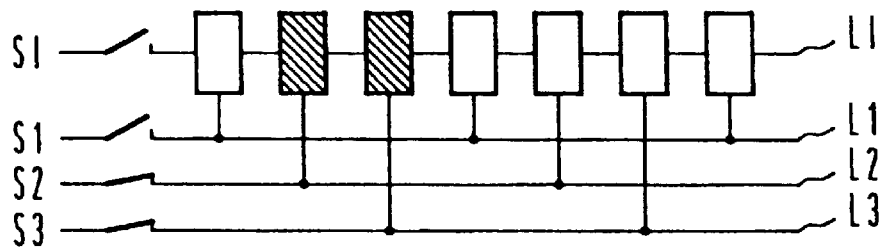

The designations of FIG. 7c hold analogously for the subsequent parts of the figure, and specifically the same designations are to be used for the control elements respectively situated one above another. Each control element can be activated separately by means of this advantageous embodiment of the control elements and the corresponding wiring in a way which is favorable in terms of cost and is technically easy to implement. However, the invention is not intended to be limited to this application. All that was taken into consideration here was that it should be possible to implement favorably in terms of cost an actuator of simple mechanical construction, and that it should be technically simple and rugged with regard to being used in consumer products.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A flexible actuator, comprising:

a helical spring formed from an elastically deformable material;

a cross-sectional area of a turn of the helical spring having in a longitudinal direction of the helical spring an elongated profile which has a bent-over edge at each end of the helical spring, a first edge being bent over towards a spring longitudinal axis of the spring and a second edge being bent over away from the spring longitudinal axis;

the helical spring configured such that the first edge and the second edge of two adjacent turns of the helical spring overlap in an overlap zone;

at least one of the first edge and the second edge is structural in the overlap zone such that it extends essentially parallel to the respectively adjacent turn of the helical spring, and forms a parallel zone therewith;

for at least one location of a respective parallel zone at least one controllable arresting device to which mutual displaceability of adjacent turns thereto is blockable;

guide eyes uniformly distributed on a circumference of the helical spring such that the guide eyes are respectively situated on at least three first parallel axes in the direction in which the helical spring extends, said axes having substantially a common separation from one another;

first tension cables which are all secured at a first end of the helical spring, the cables being guided along the first parallel axes through the eyes;

wherein a predetermined direction of movement is produced by tension exerted on at least one of the tension cables at a second end of the helical spring and wherein the guide eyes through which said at least one of the first tension cable is guided, are moved closer to one another.

2. The flexible actuator as claimed in claim 1:

wherein uniformly distributed guide slots are provided on the circumference of the helical spring such that they are situated on at least three second parallel axes, which have substantially a common separation from one another, in the direction in which the helical spring extends;

wherein second tension cables are guided along the second parallel axes through the guide slots such that they respectively embrace the mutually overlapping first and second edges in the form of at least one loop, said second tension cables all being secured at the first end of the helical spring;

wherein a predetermined direction of movement is produced by tension exerted on at least one of the first and second tension cables at the second end of the helical spring and wherein as a function of the at least one controllable arresting device, the guide eyes through which said at least one first tension cable is guided are moved closer to one another, or mutually overlapping edges which said second tension cable embraces are moved closer to one another.

3. The flexible actuator as claimed in claim 2, wherein at least the helical spring and the first and second tension cables are electrically insulated from one another.

4. The flexible actuator as claimed in claim 3, wherein the at least one device is electrically connected to the helical spring and to one of the tension cables.

5. The flexible actuator as claimed in claim 4, wherein at least a first control element and a second control element has at least a first, second and third electric connection a respective control element of the at least first and second control element being actuated by applying a voltage to the first connection and second connection, after actuation the second connection being connected to the third connection and the third connection of the first control element being connected in an electrically conductive fashion to the first connection of the second control element.

6. The flexible actuator as claimed in claim 5, wherein a switch for circuit interruption is respectively connected upstream of at least the first electrical connection and the second electrical connection.

7. The flexible actuator as claimed in claim 2, wherein the first and second parallel axes are situated one above the other.

8. The flexible actuator as claimed in claim 1, wherein the flexible actuator provides a plurality of controllable arresting devices and wherein an arresting device of the plurality of arresting devices is respectively provided for at least each first tension cable in the respective parallel zone.

9. The flexible actuator as claimed in claim 1, wherein the at least one controllable arresting device is a control element which has a blocking device which experiences a movement upon activation of the control element, the control element being secured on one of the adjacent turns and blocks the respective other turn of the adjacent turns with the blocking device.

10. The flexible actuator as claimed in claim 1, wherein arresting is performed by friction to block two adjacent springs.

11. The flexible actuator as claimed in claim 1, wherein a rod which having a predetermined cross section and which engages in at least one hole is provided as the arresting device.

* * * * *